United States Patent
Manu et al.

(10) Patent No.: US 8,504,349 B2
(45) Date of Patent: Aug. 6, 2013

(54) TEXT PREDICTION WITH PARTIAL SELECTION IN A VARIETY OF DOMAINS

(75) Inventors: Mitica Manu, Sammamish, WA (US); Jan-Kristian Markiewicz, Redmond, WA (US); Bradley A. Music, Bellevue, WA (US); Brian D. Haslam, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 11/764,783

(22) Filed: Jun. 18, 2007

(65) Prior Publication Data

US 2008/0310723 A1   Dec. 18, 2008

(51) Int. Cl.
G06F 17/20   (2006.01)

(52) U.S. Cl.
USPC ............ 704/1; 715/811; 715/781; 715/262; 715/261; 715/259; 715/255; 704/9; 704/260; 704/257; 463/40; 455/154.2; 345/169; 341/22

(58) Field of Classification Search
USPC ............ 715/781, 811, 262, 261, 259, 255; 704/9, 260, 257; 455/154.2; 463/40; 345/169; 341/22
See application file for complete search history.

(56) References Cited

U.S. PATENT DOCUMENTS

| | | | | |
|---|---|---|---|---|
| 5,099,425 A | * | 3/1992 | Kanno et al. | 704/9 |
| 5,299,125 A | * | 3/1994 | Baker et al. | 704/9 |
| 5,323,316 A | * | 6/1994 | Kadashevich et al. | 704/9 |
| 5,748,841 A | * | 5/1998 | Morin et al. | 704/257 |
| 5,805,911 A | | 9/1998 | Miller | |
| 5,835,888 A | * | 11/1998 | Kanevsky et al. | 704/9 |
| 5,896,321 A | | 4/1999 | Miller et al. | |
| 5,995,922 A | * | 11/1999 | Penteroudakis et al. | 704/9 |
| 6,208,339 B1 | | 3/2001 | Atlas et al. | |
| 6,292,771 B1 | * | 9/2001 | Haug et al. | 704/9 |
| 6,307,548 B1 | * | 10/2001 | Flinchem et al. | 715/811 |
| 6,377,965 B1 | | 4/2002 | Hachamovitch et al. | |
| 6,415,250 B1 | * | 7/2002 | van den Akker | 704/9 |
| 6,477,488 B1 | * | 11/2002 | Bellegarda | 704/9 |
| 6,820,075 B2 | | 11/2004 | Shanahan et al. | |
| RE39,326 E | | 10/2006 | Comer et al. | |
| 7,171,353 B2 | | 1/2007 | Trower, II et al. | |
| 7,185,271 B2 | | 2/2007 | Lee et al. | |
| 7,519,590 B2 | | 4/2009 | Chandrasekar et al. | |
| 7,644,072 B2 | * | 1/2010 | Budzik et al. | 707/748 |

(Continued)

OTHER PUBLICATIONS

International Search Report for PCT/US2008/065614 mailed Jun. 3, 2008. 10 Pages.

(Continued)

*Primary Examiner* — Michael Colucci
(74) *Attorney, Agent, or Firm* — Microsoft Corporation (57) ABSTRACT

A computing system may predict a word based on received user input that selects a part of the word (e.g., the first characters, the first root, etc.). Specifically, a program, when run on the computing system, may perform a method including creating a candidate list of words based on received user input. These words may be then organized into a hierarchy, or tree structure, in which each word is associated with a parent and each parent is a partial match for its associated words. The top-tier partial matches may be presented, and user input corresponding to a selected partial match may be received. A set of candidates related to the selected partial match may then be presented for user selection.

20 Claims, 7 Drawing Sheets

U.S. PATENT DOCUMENTS

| | | | | |
|---|---|---|---|---|
| 7,679,534 | B2* | 3/2010 | Kay et al. | 341/22 |
| 2002/0107896 | A1* | 8/2002 | Ronai | 707/530 |
| 2002/0152202 | A1* | 10/2002 | Perro et al. | 707/3 |
| 2003/0182631 | A1* | 9/2003 | Tsochantaridis et al. | 715/531 |
| 2004/0229697 | A1* | 11/2004 | Williams | 463/40 |
| 2004/0254928 | A1* | 12/2004 | Vronay et al. | 707/5 |
| 2005/0192807 | A1* | 9/2005 | Emam et al. | 704/260 |
| 2005/0268247 | A1* | 12/2005 | Baneth | 715/781 |
| 2006/0025091 | A1* | 2/2006 | Buford | 455/154.2 |
| 2006/0129928 | A1* | 6/2006 | Qiu | 715/535 |
| 2006/0146028 | A1* | 7/2006 | Chang et al. | 345/169 |
| 2006/0265648 | A1* | 11/2006 | Rainisto et al. | 715/534 |
| 2006/0265668 | A1 | 11/2006 | Rainisto | |
| 2006/0282575 | A1 | 12/2006 | Schultz et al. | |
| 2006/0293890 | A1 | 12/2006 | Blair et al. | |
| 2009/0076795 | A1* | 3/2009 | Bangalore et al. | 704/9 |

OTHER PUBLICATIONS

International Preliminary Report on Patentability cited in PCT Application No. PCT/US2008/065514 dated Dec. 22, 2009, 8 pgs.

First Chinese Office Action cited in Chinese Application No. 200880020149.9 dated Jan. 25, 2011, 6 pgs.

Second Chinese Office Action cited in Chinese Application No. 200880020149.9 dated Jul. 19, 2011, 6 pgs.

"Predictive Text Entry Methods for Mobile Phones", Mark D. Dunlop and Andrew Crossan, Personal Technologies, vol. 4, Nos. 2-3, 2000, reprinted from the Internet at: http://www.cis.strath.ac.uk/~mdd/research/publications/00dunloperossan.pdf, 10 pgs.

"Semantic Autocompletion", Eero Hyvonen and Eetu Makela, 2006, reprinted from the Internet at: https://docs.google.com/viewer?a=v&g=cache:3lpk-8JCkRYJ:citeseerx.ist.psu.edu/viewdoc/download?doi%3D10.1.1.104.7710%26rep%3Drep1%26type%3Dpdf+semantic+autocomplete&hl=en&gl=us&pid=bl&srcid=ADGEEShxc-lbN3TAboiVGFNttGGHTHPUha__j3A21ApnYm9Vlgku50FHz8ADHVjh6EjVVs-TqayDsncKW7aPoh5vAy1YRnle4b0t8-xtKhGnITfOrc5VQNtIBa8JkkftOG1vaLPJaFuAb&sig=AHIEtbQIMVz6LahU6rDKHSHHDHLdblksJw, 13 pgs.

"AutoComplete 5.0 for MS Word", Copyright 2006-2007, reprinted from the Internet at: http://www.globalshareware.com/AutoComplete-for-MS-Word-5-point-0.html. 1 pg.

"Microsoft Word's AutoComplete & AutoText Features", 2004, reprinted from the Internet at: http://computing.fandm/edu/training/wordx/autotext/php, 4 pgs.

Reply first Chinese Office Action cited in Chinese Application No. 200880020149.9 dated Jun. 4, 2011, 13 pgs.

Reply second Chinese Office Action cited in Chinese Application No. 200880020149.9 dated Sep. 21, 2011, 12 pgs.

Chinese Notice of Allowance cited in Chinese Application No. 200880020149.9 dated May 9, 2012, 4 pgs.

\* cited by examiner

TEXT PREDICTION WITH PARTIAL SELECTION IN A VARIETY OF DOMAINS

BACKGROUND

Figure 1:
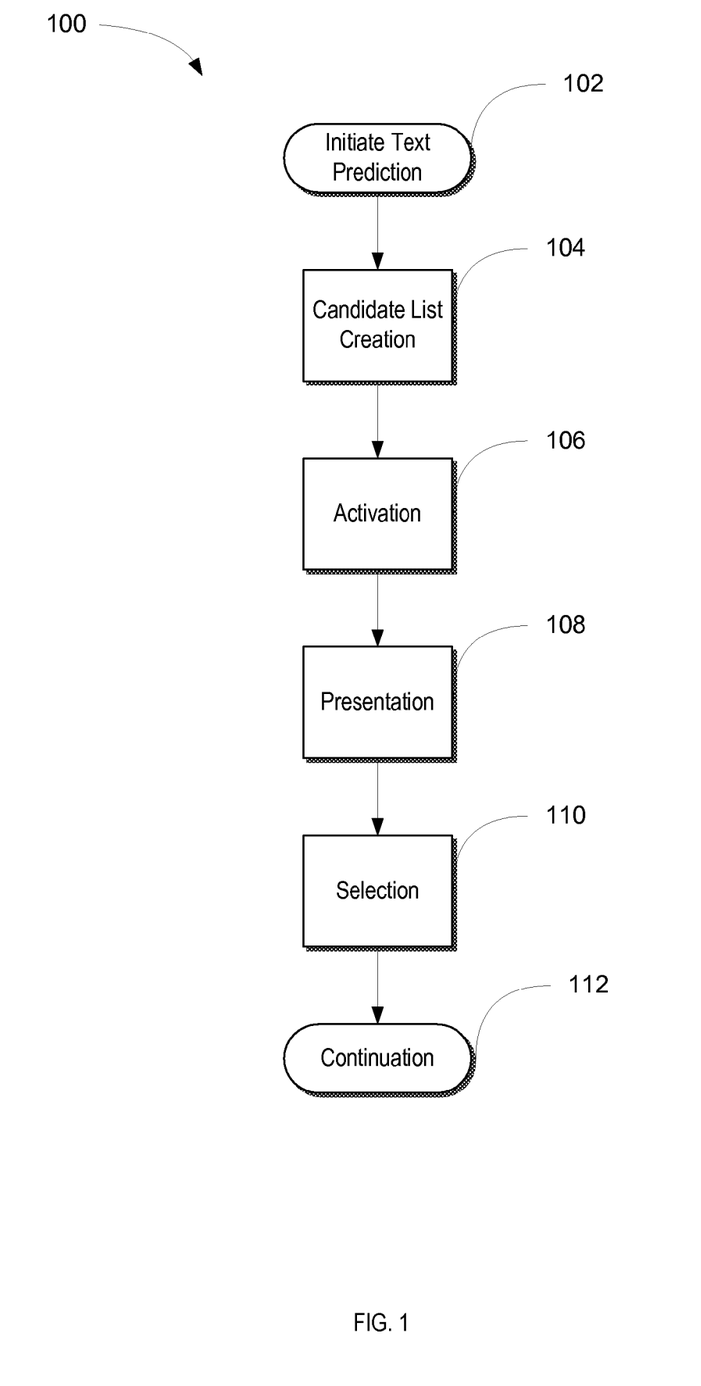
FIG. 1 shows an overview of a predictive process for facilitating word completion.

FIG. 1 provides an overview of a prediction process. A candidate list is created 104 based on received user input. For example, a user may enter the letters "os" into a computing device, such as a table personal computer (PC). The computing device may create a candidate list of words that start with the received user input. Predictive support may be activated 106 (e.g., when a certain number of characters have been received) and then presented 108 to the user, such as an on-screen display presentation. The user may then select 110 a candidate, which is then inserted into the document.

Such prediction mechanisms for auto-completion of text are successful in specialized applications, such as integrated development environments for creating computer applications. This is partially because programming languages have a limited vocabulary and a well defined grammar. However, prediction mechanisms may fail in general purpose editors, such as word processing applications, unless the completion is unambiguous (for example, the completion of a date or signature). This is particularly a problem for languages with complex morphology where a word may have a multitude of forms varying by the endings, or where words can combine with other words for form long compounds. Phenomena like this make it difficult for the system to determine an unambiguous completion. This can be frustrating for users who wish to benefit from a prediction mechanism, particularly users who are creating documents for specialized fields where the use of complicated, and sometimes lengthy, terms are common, such as the areas of law or medicine.

Existing systems may also fail to provide an effective methodology of selecting a desired word when a large candidate list of possible words is available. For example, if thirty words are associated with received user input, it may be more time consuming to scroll through the entries than to complete the user input without the support of a prediction mechanism. Long lists of candidates may pose an even more significant challenge for small-screen devices, such as mobile phones, personal digital assistants, etc. Although it may be possible to reduce the candidate list by waiting until more user input is received before activating the list, this benefit may come at the expense of providing meaningful predictive support to the user.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A computing system may predict a word based on received user input that selects a part of the word (e.g., the first characters, the first root, etc.). Specifically, a program, when run on the computing system, may perform a method including creating a candidate list of words based on received user input. The candidate list of words may be then organized into a hierarchy, or tree structure, in which each word is associated with a parent and each parent is a partial match for its associated words. The top-tier partial matches (e.g., the first set of partial matches) may be presented, and user input corresponding to a selected partial match may be received. A set of candidates related to the selected partial match may then be presented for user selection. This may enable meaningful predictive support with limited received user input in conjunction with a comprehensive candidate list and limited options presented at any given time.

Additionally or alternatively, maximally distinct completed words may be presented (e.g., two or more words having different letters close to the start of each of the words).

Additionally or alternatively to presenting multiple completion possibilities, a single most likely word may be presented either adjacent to the writing area or directly within the writing area.

These methods of presentation may be used in combination with or independent of a partial selection method in which the user may begin editing the first undesired character of the completion, thereby accepting the preceding characters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer device, the system described is provided as an example and not a limitation. As those skilled in the art will appreciate, the present examples are suitable for application in a variety of different types of computing, entertainment, and communication systems.

Figure 2:
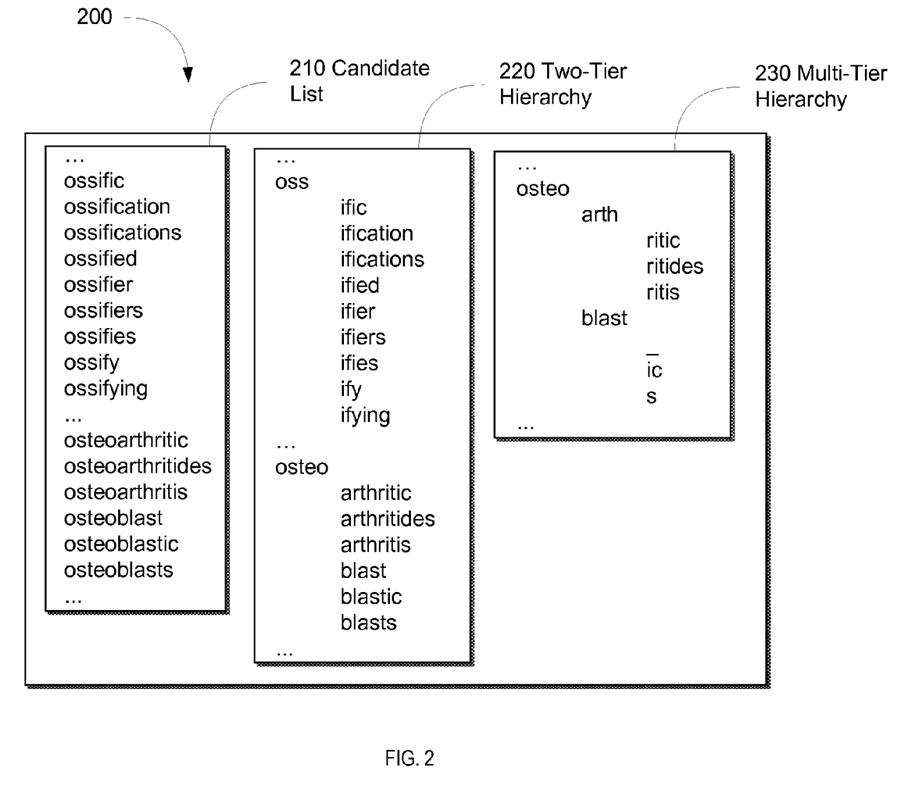
FIG. 2 shows a logical representation of an active dictionary.

FIG. 2 shows a logical representation of an active dictionary 200 that may include words, phrases, roots, and/or other information. The active dictionary 200 may be general, customized to a specialized field, and/or customized by a user. This dictionary may be stored in volatile and/or non-volatile memory on computing device 300 (shown in FIG. 3). A computing device 300 may have multiple dictionaries, and one or more of these dictionaries may be designated as active. For example, a user may have one or more general purpose dictionary and/or one or more medical, legal, engineering, and/or other types of dictionaries having words (or phrases) relating to a particular discipline loaded on a computer, and a subset of these may be designated as active for the purpose of prediction. A dictionary may be active for prediction because it has been activated generally (e.g., for the purpose of spell-checking and prediction), activated specifically for prediction (e.g., two dictionaries are active for spell-checking, while only one is active for prediction), or otherwise activated.

Within the active dictionary 200 is a listing of words. A candidate list 210 may be a subset of the listing of words in the active dictionary 200 that match a received user input. For example, candidate list 210 may be a partial listing of the words in the active dictionary 200 that partially match the received user input "os" and possibly fit other criteria for inclusion in the candidate list (e.g., frequency of usage, occurrence in a preferred dictionary, or suitability based on surrounding context). This user input may be received in a variety of modalities, including handwriting on a handwriting-recognition enabled tablet PC, entering by keyboard (hard keyboard, or soft, on-screen keyboard), speaking into a microphone, etc. The term user input may include user input received by an application (e.g., characters and commands since a new document was created), the characters received since a special character was received (e.g., all characters received since the last space, paragraph, prediction activation key, etc.), or other types of user input. Generally, the term user input refers to all characters received since a special character was received.

Two-tier hierarchy 220 represents the candidate list 210 grouped under parent partial matches (e.g., the hierarchy includes each of the words in the candidate list and a plurality of partial matches to which each of the words is associated). A partial match may be described as a relationship between two sets of characters in which the first set of characters is equivalent to a leading portion of the second set of characters (e.g., the set of characters "char" is a partial match for the set of characters "charac" as well as the sets of characters "character", "characterize", etc.). Two-tier hierarchy 220 may be used in the process depicted in FIG. 4. By way of overview, "ossific" and "ossification" may be grouped under the partial match "oss." In the two-tier hierarchy 220, the top-tier of the hierarchy may be partial matches, and the second tier may contain the entire candidate list 210. Alternatively, the two-tier hierarchy 220 may include members of the candidate list 210 on the top level as well.

The groupings may be based on metrics (e.g., such that each partial match has a targeted number of children, such as 2-10 children), history (e.g., based on selections made by the user, past and present user input, etc.), linguistic components (e.g., roots, stems, syllables, etc.), or other techniques. By way of specific example, a grouping established such that each partial match has a target range of options per partial match may be implemented by first analyzing a set of possible hierarchies that match the received user input and then selecting a hierarchy that best satisfies the target range (e.g., fully satisfies the target range criteria, has the fewest number of partial matches with too few or too many children, etc.). The groupings may be established in response to the user input, or created in advance of the user input and stored as part of the dictionary and/or outside the dictionary. Additionally, in one embodiment, a single word may be part of multiple partial matches.

The partial matches, and the relationships between the partial matches, the candidates, and the received user input may be stored in any suitable manner, such as inline (e.g., directly in the dictionary as part of the dictionary listing), in a lookup table (e.g., another data store that identifies partial matches and which words are related to which partial match), or otherwise stored. Furthermore, some or all of the partial matches, and the relationships between the partial matches, the candidates, and the received user input may be dynamically determined. For example, when the user input "os" is received, any partial match that starts with the received user input may be matched.

Multi-tier hierarchy 230 represents a hierarchy in which a partial match (e.g., "arth") may be both the child of another partial match (e.g., "osteo") as well as the parent of a candidate (e.g., "osteoarthritic"). Multi-tier hierarchy 230 may be otherwise configured similarly to the two-tier hierarchy 220. Multi-tier hierarchy 230 may be used in the process described with respect to FIG. 5.

Figure 3:
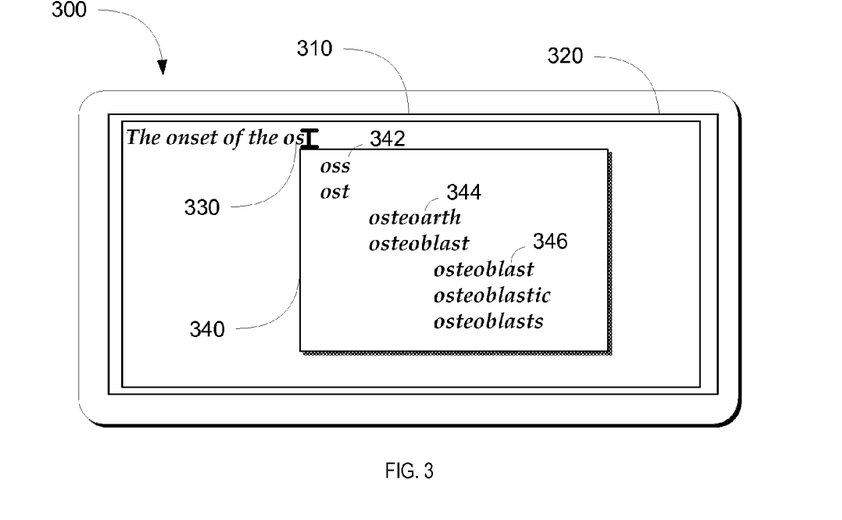
FIG. 3 shows an exemplary computing device displaying an exemplary graphical user interface with a candidate list hierarchy.

FIG. 3 shows an exemplary computing device that enables a user to interact with a candidate list. Specifically, computing device 300 displays an exemplary graphical user interface 320 with a candidate list hierarchy 340. The candidate list hierarchy 340 may include top-tier partial matches 342 and candidates 346. In a multi-tier hierarchy, the candidate list hierarchy 340 may also include nested partial matches 344. As the user provides input (e.g., writes onto a table PC), the computing device 300 may present a candidate list hierarchy 340 with which the user may interact to select a desired word from the displayed candidates 346 in an efficient manner. In one embodiment, the style of the partial matches and candidates in the candidate list hierarchy 340 may be adjusted to approximate the appearance of the user input to minimize discontinuity (e.g., if the received user input is handwritten user input, present the candidate list hierarchy in a style that emulates the handwriting or selects a font and style that best approximates the handwriting style). The style may comprise a selection of font, font size, font attributes (e.g. bold, italic, underlined, font color) and/or other attributes that affect the appearance of the candidates for handwritten text. Also, when the received user input is typed, the style of the candidates may match the style of the typed input exactly. Furthermore, regardless of the style of the items in a candidate list, after an item has been selected from a candidate list, the text inserted may be formatted to be similar to the format and/or style of the text appearing before the suggestion.

Figure 4:
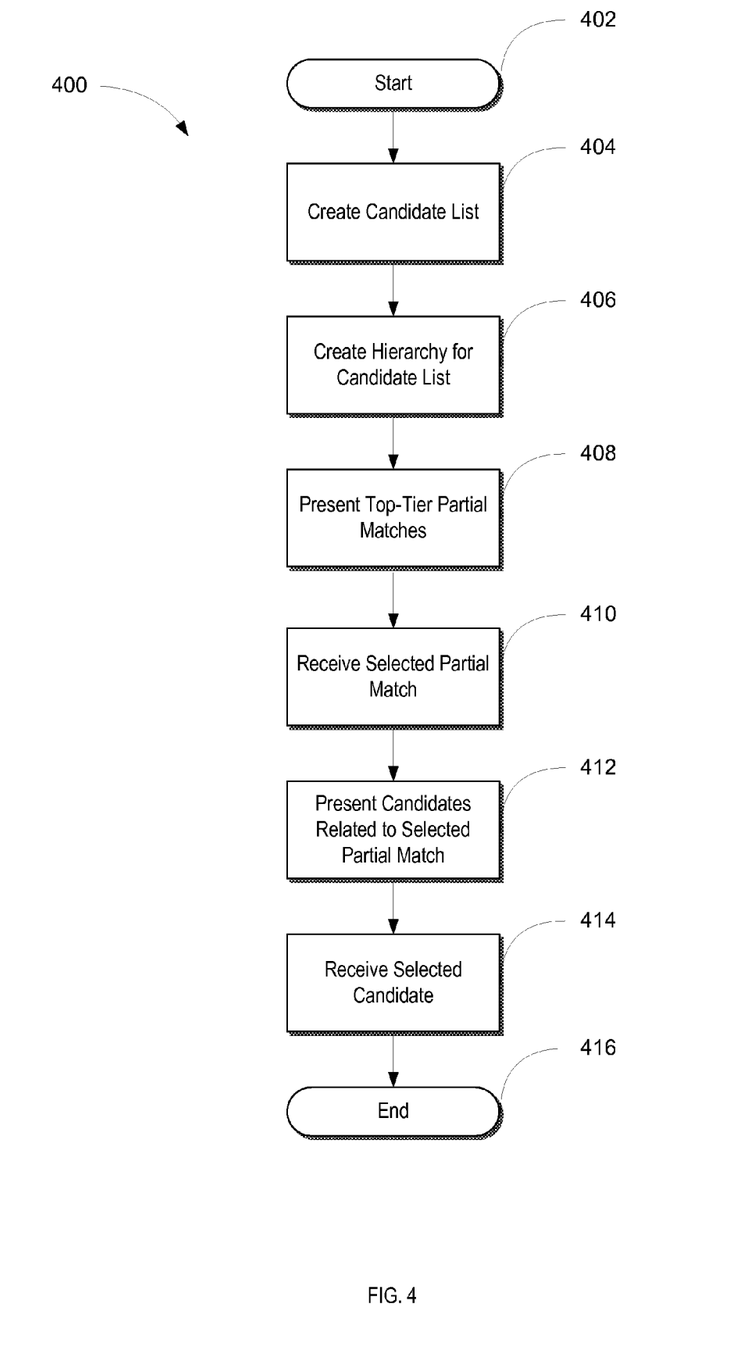
FIG. 4 shows a process for predicting a word based on partial selection with a two-tier hierarchy.

FIG. 4 shows a process for predicting a word based on partial selection with a two-tier hierarchy (e.g., two-tier hierarchy 220). Creating 404 the candidate list may be initiated based upon received user input (e.g., receipt of the letters "os"), may be done in advance in anticipation of received user input, or otherwise initiated. A hierarchy for the candidate list may be created 406. For example, the candidate list may be grouped based on sharing a common root, stem, syllable, etc. This grouping may be done upon receipt of or prior to the receipt of user input. The hierarchy may include each of the words in the candidate list and a plurality of partial matches to which each of the words is associated.

Presenting 408 a top-tier of partial matches may result in a presentation of the "oss" and "ost" partial matches depicted as the top-tier partial matches 342 of FIG. 3. Receiving 410 user input corresponding to a selected partial match may include receiving a selection on a liquid crystal display (LCD) touch screen, use of arrow and enter keys on a keyboard, use of a wheel on a cell phone, or any type of user input device that enables a user to make a selection from a user interface.

Presenting 412 a set of candidates related to the selected partial match may involve presenting the children of the node selected at 410. For example, the candidates "ossific," "ossification," "ossifications," etc., shown in the two-tier hierarchy 220 of FIG. 2 under the "oss" partial match may be presented. Receiving 414 user input corresponding to a selected candidate may involve the selection of one of the candidates. Alternatively or additionally, the final user input may correspond to cancelling the prediction request if the candidate is not present, an update request for the prediction process, or other type of request or command.

Figure 5:
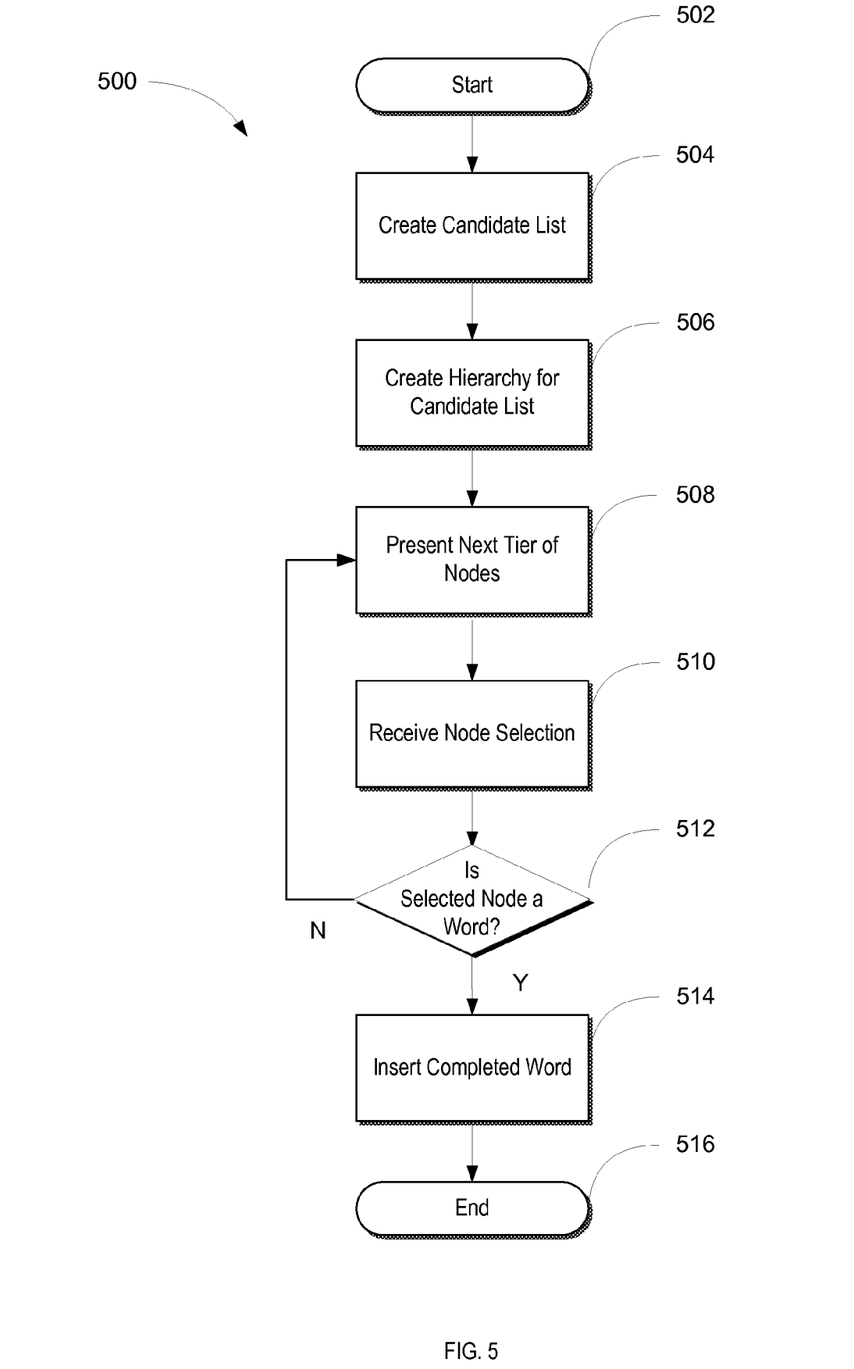
FIG. 5 shows a generalized process for predicting a word based on partial selection.

FIG. 5 shows a generalized process for predicting a word based on partial selection that may accommodate hierarchies of greater than two levels. The candidate list is again created 504, either in response to the user input or in anticipation of the received user input. The hierarchy for the candidate list is created 506 in accordance with step 406 above.

The following steps are repeated until the selected node is a word (or the user cancels the process, not shown). The next tier of nodes is presented 508. If this is the first pass through the process 500, then the top-tier nodes are presented (e.g., "oss" and "ost"). If this is a subsequent pass, then the children of the selected node are presented (e.g., if "ost" has been selected, then the nested partial matches 344 of FIG. 3 may be depicted, such as "osteoarth" and "osteoblast", whereas if "osteoblast" has been selected, then the candidates 346 having "osteoblast" as a parent are presented, such as "osteoblast", "osteoblastic", and "osteoblasts"). User input corresponding to the selected node is received 510. The computing device 300 then determines 512 whether selected node is a word or a partial match. When the selected node is a word (yes at 512), inserting 514 the completed word (e.g., into a word processing document). When the selected node is a partial match (no at 512), the process returns to 508, but with a new selected node.

In one embodiment, a node corresponding to a word is presented in a different manner than a node corresponding to a partial match for a word. Nodes corresponding to a word and nodes corresponding to partial matches for a word may be presented on the same tier, different tiers, or a combination of the two.

In another embodiment, maximally distinct completed words may be presented (e.g., two or more words having different letters close to the start of each of the words) for selection by a user. For example, considering the words "metabolic," "metabolics," "metathesis," and "metatheses," instead of presenting each of these words in a candidate list, the maximally distinct words may be shown (e.g., the set of words "metabolic" and "metathesis", "metabolic" and "metatheses," etc., in which each pair has different characters at the fifth character position). Upon selection of one of the maximally distinct words, the computing device may determine whether other words need to be displayed and, if so, provide a subsequent candidate list having these words. For example, upon selection of the word "metathesis," providing a candidate list including "metathesis," and "metatheses". Similarly, the selected word may be assumed to be correct, and a candidate list may be presented that includes only alternate words that a user may select. Other methodologies may also be used.

Figure 6:
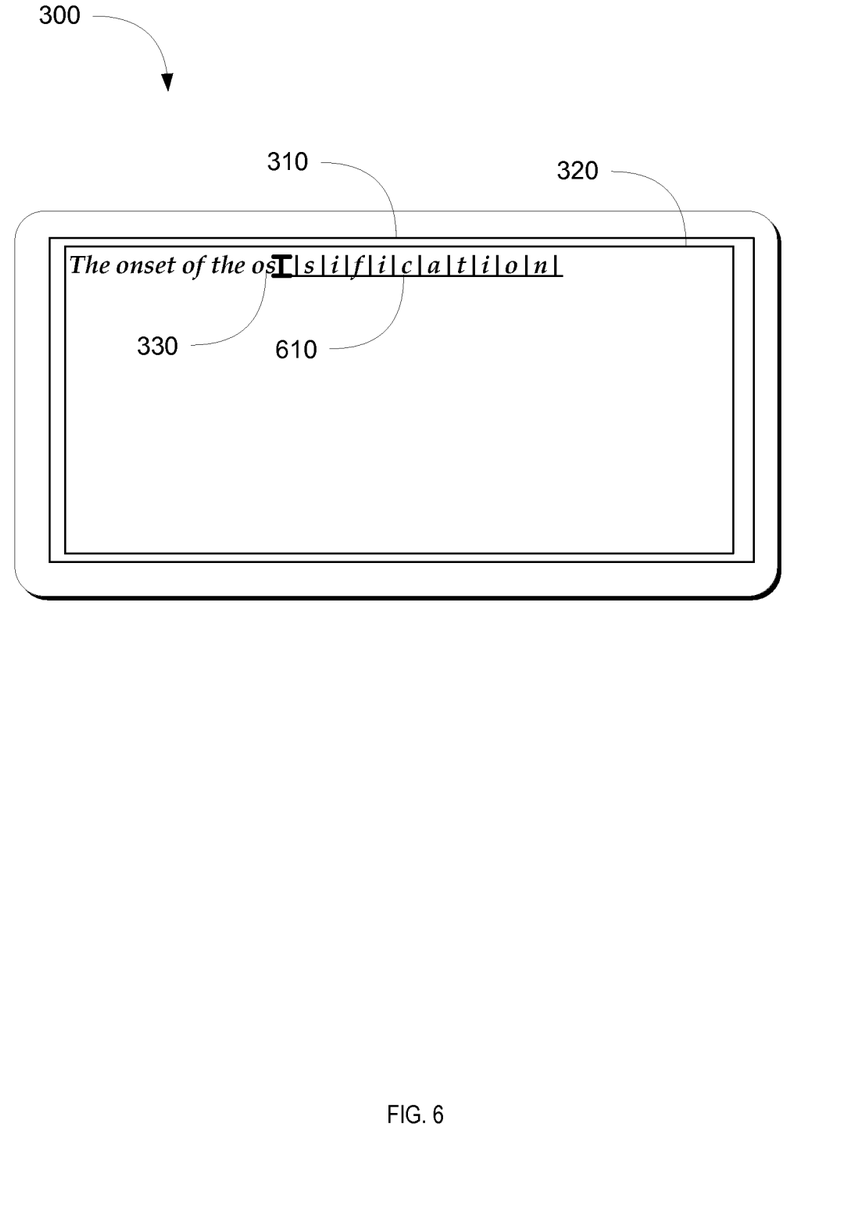
FIG. 6 shows an exemplary computing device displaying an exemplary graphical user interface with an inline prediction interface.

FIG. 6 shows an exemplary computing device displaying an exemplary graphical user interface with an inline prediction interface 610. Instead of using a drop down to present the hierarchy, a best match is presented inline (e.g., in an area that can be edited by the user). The user may then select an incorrect letter and overwrite this letter in a manner described with respect to FIG. 7. In a preferred embodiment, the inline prediction interface 610 may be used with handwriting recognition software. In an alternate embodiment, the inline prediction interface 610 may be used with a keyboard. Other embodiments may also be used (e.g., speech input).

Figure 7:
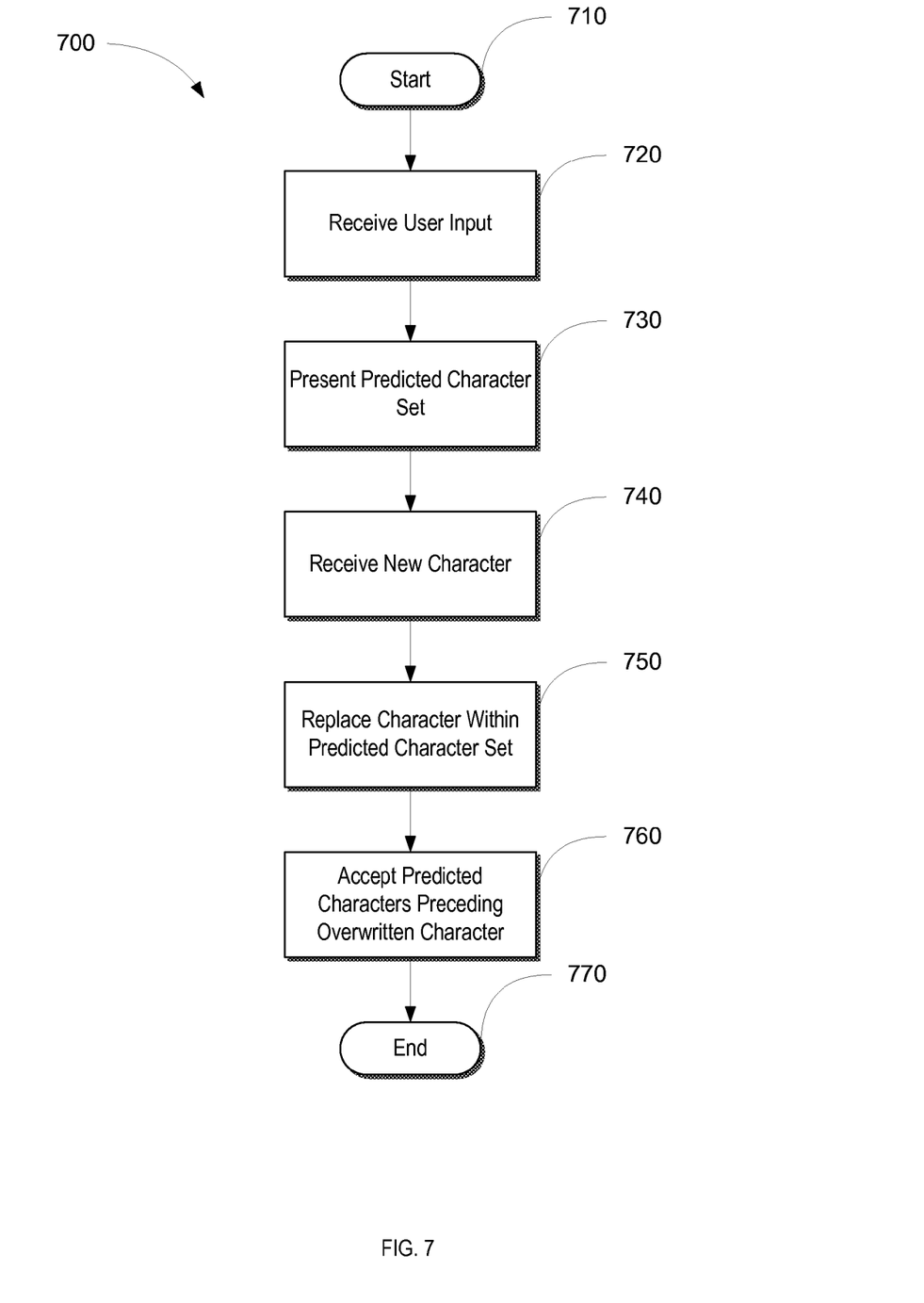
FIG. 7 shows a process for completing a word based at least partially on an accepted character and a new character user input.

FIG. 7 shows a process for completing a word based at least partially on an accepted character and a new character user input, which may be used to implement the inline prediction interface described with respect to FIG. 6. User input is received 720 and a predicted character set is presented 730 inline. If the word matched the user's desired word, the user may accept the predicted character set and terminate the operation (not shown). If, however, the predicted word is not the word the user intended to write, the user may select the first incorrect letter in the word and overwrite that character (e.g., by placing a stylus over the letter "c" of the inline prediction interface 610 and writing the letter "e"). When this new character is received 740, this character replaces 750 the overwritten character and accepts 760 one or more characters between the overwritten character and the end of the first set of user input as an accepted character (e.g., the letters "sifi" between the overwritten letter "c" and the "s" of the "os" entered by the user).

The user may then complete the word (e.g., "ossifiers") by writing in the remainder of the letters. Additionally, the user may complete the word by selecting a subsequently predicted word provided by the inline prediction interface 610, wherein the subsequent prediction is based on the user input, the new character (e.g., "e"), and the accepted character (e.g., "sifi"). Accordingly, whether the user provides input for the remainder of the word or accepts a subsequent prediction, the completed word is based at least partially on the first set of user input, the accepted character, and the new character user input. Similarly, the completed word is not the initially predicted word, but the user was able to accept a subset of the predicted letters to complete the word.

Figure 8:
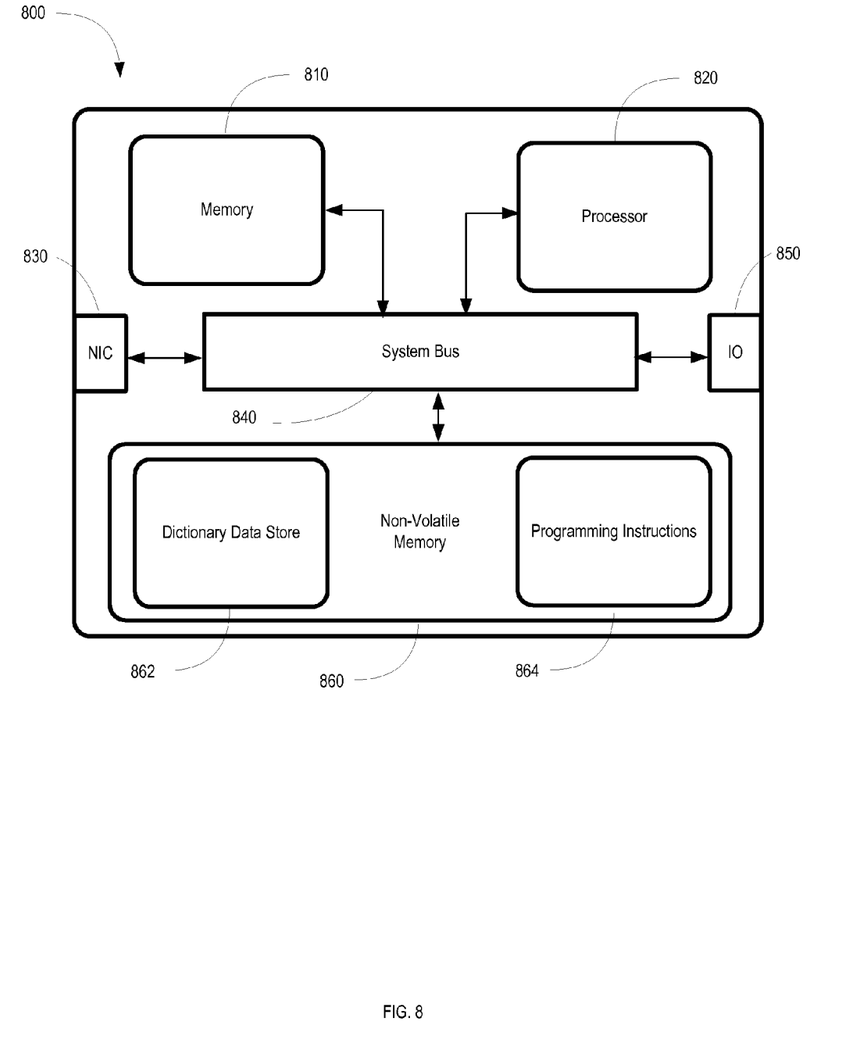
FIG. 8 shows a computer system in an exemplary implementation that is operable to enable text predictions with partial selection.

FIG. 8 shows a computer system 800 that may include a memory device 810, such as random access memory, a processor 820, such as a microprocessor, a network interface 830, such as a network interface card, an input/output communication interface 850, such as an interface to device display 310, and a system bus 840 that interconnects the components of the computer system 800. The network interface may enable communication with a remote computer (not shown) for receiving updated dictionaries, for example. Additionally, the computer system 800 may include non-volatile memory 860 having computer readable data including a dictionary data store 862 and programming instructions 864, which may be stored on a file system, in a database, or otherwise. During program execution, data and instructions may be transferred from the non-volatile memory 860 to memory 810. The computer system may be housed in a console that provides structure, support and protection for the included devices.

Non-volatile memory 860 and memory 810 are both examples of computer readable storage media. By way of example, and not limitation, computer readable storage media may include volatile and non-volatile, removable and non-removable media implemented in any method or technology for storage of information such as computer readable instructions, data structures, program modules, or other data. Computer readable storage media includes, but is not limited to, RAM, ROM, EEPROM, flash memory, or other memory technology, CD-ROM, digital versatile disks (DVD) or other optical storage devices, or any other medium which can be used to store the desired information and which can be accessed by computer system 800.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Furthermore, although the context for the disclosed system and method have been largely explained with respect to a tablet PC, other computing, entertainment, and communication devices may be used, included mobile devices, personal digital assistants (PDAs), cellular phones, desktop computers, servers, and other types of devices. Additionally, the context of the disclosed system and method have been directed to the completion of a word, other units of communication may also be used, such as phrases, sentences, paragraphs, etc.

The invention claimed is:

1. A computer-implemented method for predicting a word, comprising:
   creating a candidate list of words based on received user input;
   grouping respective words of the candidate list according to a common character set, a common character set comprising two or more characters;
   presenting at least two common character sets as a first tier, a first group of words represented by a first common character set and a second group of words represented by a second common character set, no words within the first group of words capable of being represented by the second common character set and no words within the second group of words capable of being represented by the first common character set;
   receiving a user selection of a presented common character set; and
   presenting at least some words of the group of words represented by the selected common character set.

2. The method of claim 1, comprising:
   receiving a user selection of a word from the presented words; and
   inserting the selected word into a document.

3. The method of claim 1, the common character sets based on linguistic roots.

4. The method of claim 1, the common character sets based on linguistic stems.

5. The method of claim 1, the common character sets based on linguistic syllables.

6. The method of claim 1, respective common character sets representing a target range of words.

7. The method of claim 6, respective common character sets respectively representing at least two words.

8. The method of claim 1, the first tier of common character sets and the at least some words of the group of words represented by the selected common character set presented in a style similar to the style of the received user input.

9. A computing device comprising:
   a console coupled with an input interface and a display interface, the console comprising computer-readable instructions for performing a word completion process, the word completion process comprising:
      creating a candidate list of words based on received user input at the input interface;
      presenting a first tier of nodes for display on the display interface, respective nodes comprising two or more characters and representing a plurality of words in the candidate list that begin with the two or more characters, respective nodes not comprising completed words;
      receiving input corresponding to a selection of a node presented in the first tier of nodes; and
      presenting a second tier of nodes for display on the display interface, respective nodes of the second tier of nodes comprising at least one additional character than the selected node and representing one or more words that begin with the two or more characters of the selected node.

10. The computing device of claim 9, comprising:
    receiving input corresponding to a selection of a node presented in the second tier of nodes;
    determining whether the selected node presented in the second tier of nodes is a word from the candidate list; and
    when the selected node is a partial match for a word from the candidate list, presenting a third tier of nodes for display on the display interface, respective nodes of the third tier of nodes comprising at least one additional character relative to the characters of the selected node presented in the second tier and representing one or more words that begin with the characters of the selected node presented in the second tier.

11. The computing device of claim 10, at least one of:
    a node in the second tier of nodes corresponding to a word from the candidate list presented in a different manner than a node in the second tier corresponding to a partial match for a word from the candidate list, or
    the second tier of nodes comprising at least one node comprising a word from the candidate list and at least one node comprising a partial match for a word from the candidate list.

12. The computing device of claim 9, creating the candidate list of words comprising:
    determining words for inclusion in the candidate list based on the received user input and at least one of frequency of usage, occurrence in a specified dictionary, or suitability based on surrounding context.

13. The computing device of claim 9, creating the candidate list of words comprising:
    determining words for inclusion in the candidate list based on the received user input and previous word selections of a user of the console.

14. The computing device of claim 9, a first node in the first tier of nodes corresponding to a first group of words in the candidate list and a second node in the first tier of nodes corresponding to a second group of words in the candidate list, the first group of words not overlapping the second group of words.

15. A computer-implemented method comprising:
    determining a first set of one or more predicted characters based on one or more user inputted characters;
    presenting the first set of one or more predicted characters in an area that can be edited by a user;
    receiving new character user input that overwrites a predicted character of the first set of one or more predicted characters;

removing a subset of characters of the first set of one or more predicted characters, the subset following the predicted character overwritten by the new character user input, the subset removed in response to receiving the new character user input;

accepting one or more predicted characters between the overwritten character and an end of the one or more user inputted characters; and completing a word-based at least partially on the one or more user inputted characters, the accepted one or more predicted characters, and the new character user input.

16. The computer-implemented method of claim 15, the accepted one or more predicted characters comprising one or more letters.

17. The computer-implemented method of claim 15, comprising:

presenting a revised set of predicted characters after the new character user input based on the one or more user inputted characters, the accepted one or more predicted characters, and the new character user input, the one or more user inputted characters, the accepted one or more predicted characters, the new character user input, and the revised set of predicted characters forming a word.

18. The computer-implemented method of claim 15, the accepted one or more predicted characters accepted without accepting the first set of one or more predicted characters in its entirety.

19. The computer-implemented method of claim 15, comprising presenting the first set of one or more predicted characters in the area as a string of characters having a beginning character and a last character, and receiving new character user input comprising overwriting a character in the string other than the last character in the string.

20. The computer-implemented method of claim 15, one or more of the predicted characters between the overwritten character and the end of the one or more user inputted characters not validated prior to receiving the new character user input that overwrites the predicted character.

* * * * *